Patented Aug. 20, 1929.

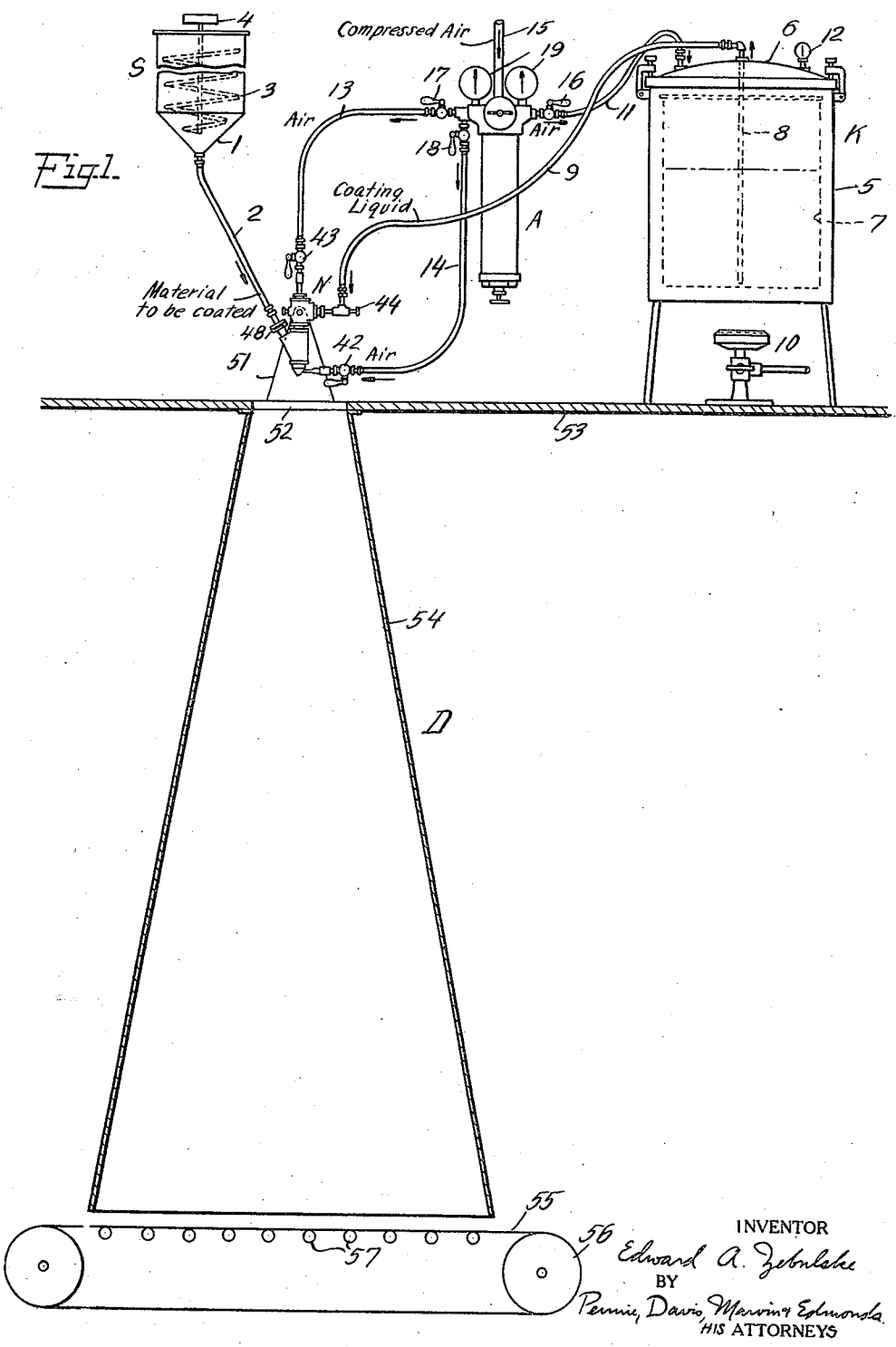

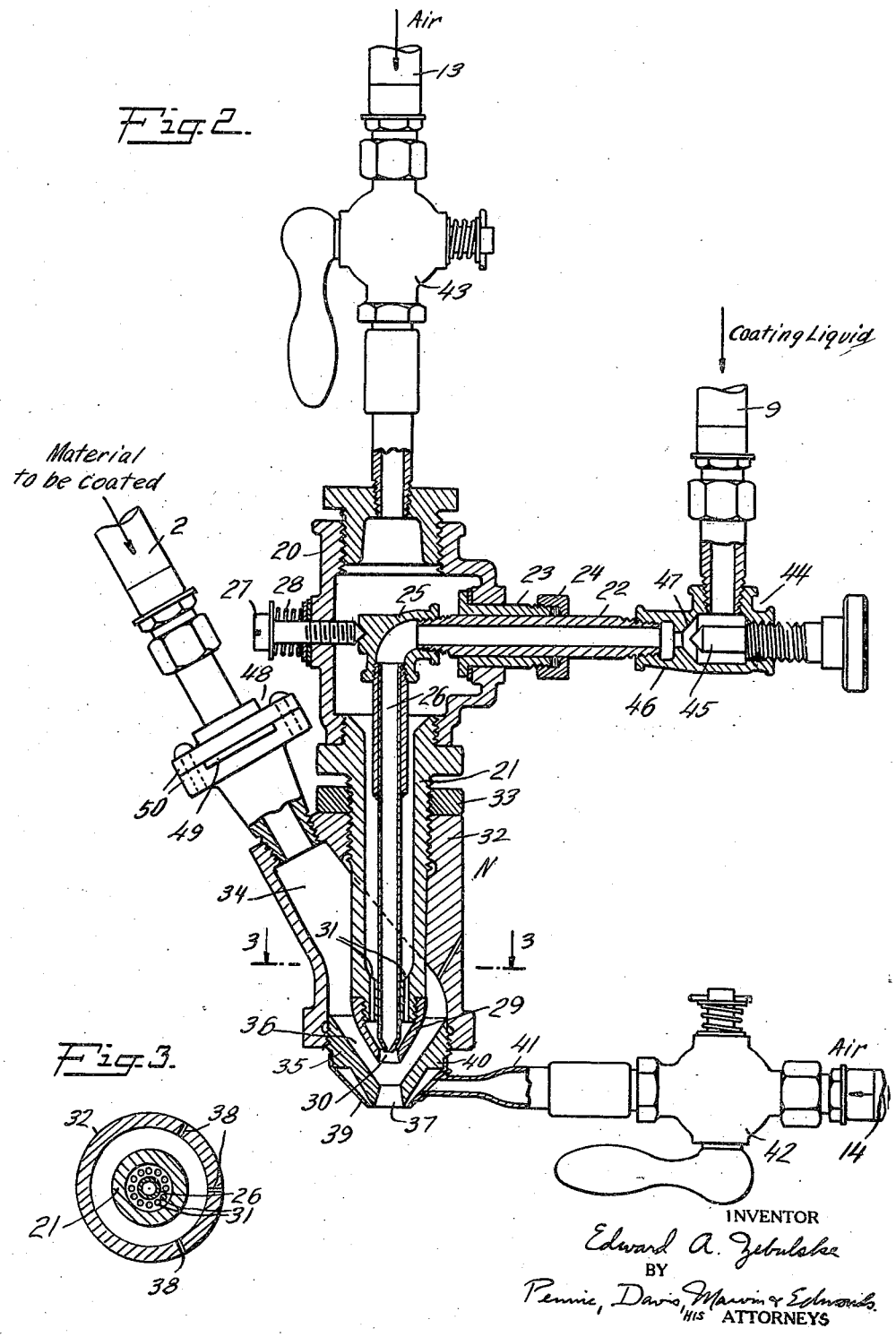

1,725,608

UNITED STATES PATENT OFFICE.

EDWARD A. ZEBULSKE, OF NORTH TONAWANDA, NEW YORK, ASSIGNOR, BY DIRECT AND MESNE ASSIGNMENTS, OF ONE-HALF TO HYLA F. MAYNES AND ONE-HALF TO EMMA C. MAYNES, BOTH OF NORTH TONAWANDA, NEW YORK.

PROCESS AND APPARATUS FOR COATING GRANULAR MATERIAL.

Application filed May 1, 1928. Serial No. 274,303.

This invention relates to a process and apparatus for applying a coating material in liquid form to small objects, and more particularly concerns a method and means for applying a coating material such as melted chocolate to small pellets, granules or particles of edible, medicinal or other material.

Thus, for example, in the preparation of a base for chocolate syrup, the ingredients to be employed comprise dehydrated milk, sugar and chocolate. It has been found that the milk and sugar can be combined and dried to a finely granulated state, and in accordance with the present invention, it is proposed to coat this dried and granulated mixture of milk and sugar with chocolate by blowing the granulated material and the melted chocolate simultaneously through a suitably constructed nozzle with the aid of compressed air, each individual particle of the granulated material being thereby encased in a layer of chocolate which dries and hardens as the material is propelled out of the coating nozzle.

In like manner, this invention contemplates the coating of other edible materials in powdered, granular or other finely divided form. Thus candies, sugar, nuts, fruits, cereals, powdered milk, malted milk or any other finely divided edible products may be coated with chocolate or any other suitable liquefied coating material. The process and apparatus of the present invention is also effective in coating medicinal pills or pellets with chocolate, sugar or any other desired substance. In general, the invention is applicable to the coating of any dry or solid substance in finely divided form with a liquefiable and drying coating material.

One of the most important applications of my invention lies in the coating of granulated sugar with chocolate. Many attempts have been made to granulate chocolate and thus make it available for uses for which bar chocolate is not well adapted, but all such attempts, so far as I am aware have proved commercially unsuccessful, due principally to the fact that when chocolate is granulated it changes in color from the characteristic deep rich brown to a much lighter less pleasing color. Each minute granule produced by the present process possesses the characteristic chocolate color and yet the whole mass is ready for instantaneous use.

The invention further includes novel apparatus for carrying out the process generally described. Thus, in accordance with the invention, a novel form of nozzle for effecting the coating operation is provided. The apparatus of the present invention further includes novel means for storing the material to be coated and the coating substance, means for delivering these materials to the coating nozzle and means for drying, collecting and storing the coated material after it leaves the nozzle.

Various other specific objects, advantages and characteristic features of the present invention will be pointed out or will become apparent as the description thereof progresses.

In describing the invention in detail, reference will be made to the accompanying drawings, in which—

Figure 1 is a simplified and diagrammatic side view of the coating apparatus comprising a typical embodiment of the present invention;

Fig. 2 is an enlarged sectional side view of the nozzle employed in the apparatus of Fig. 1;

Fig. 3 is a sectional view taken along the line 3—3 of Fig. 2, and viewed in the direction of the arrows.

Figure 4:
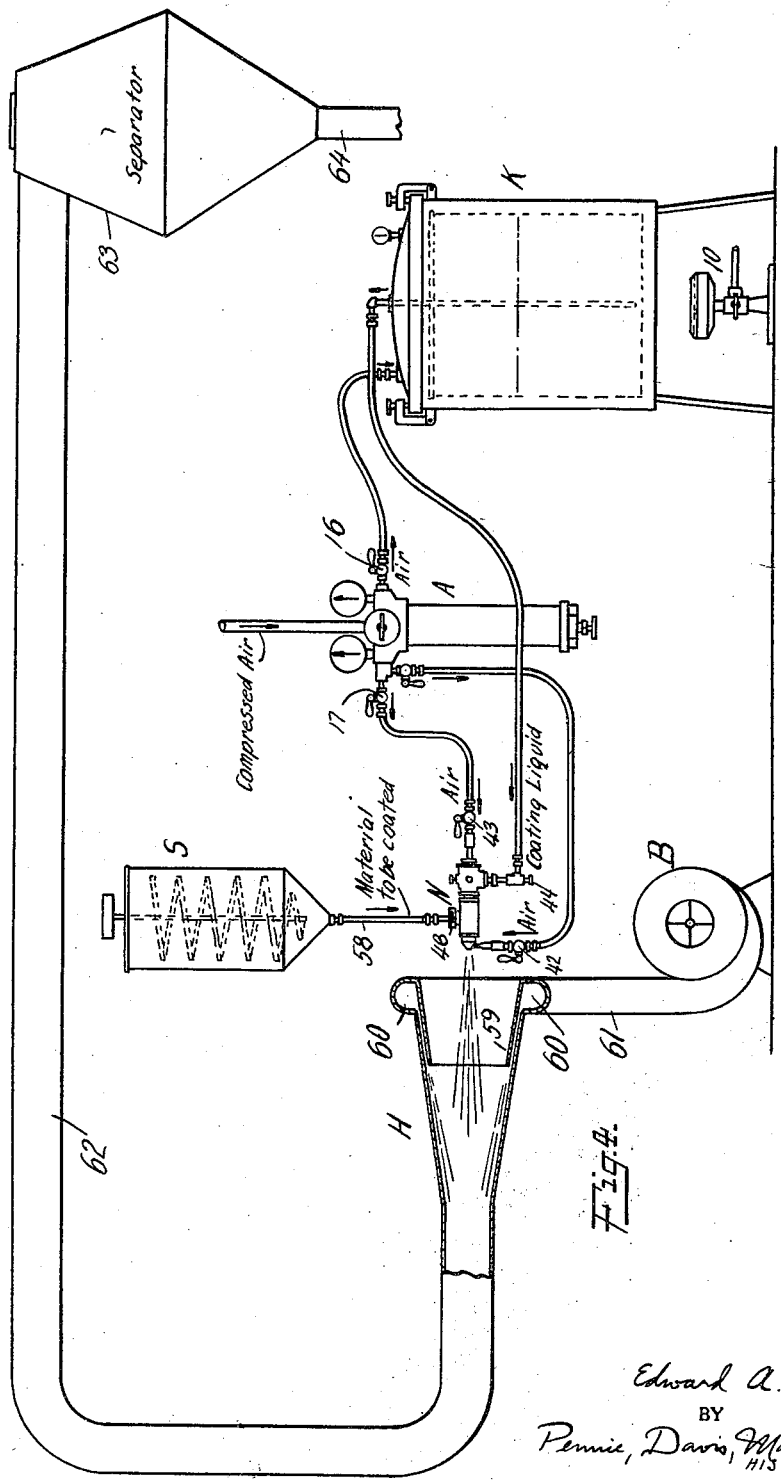
Fig. 4 is a diagrammatic view of a modified form of the apparatus embodying the present invention.

The present invention has been disclosed herein in connection with apparatus for coating a suitable powdered substance, such as a dried mixture of powdered milk and sugar, with chocolate, as briefly described above. It should, however, be understood that the apparatus disclosed merely illustrates one specific embodiment of the invention, and that in its broader aspects, the invention is limited to neither the devices disclosed nor the materials described herein as being treated by such devices.

Referring to the drawings, and more particularly to the embodiment of the invention illustrated in Figs. 1, 2 and 3, the coating apparatus comprises generally a storage chamber S for the material to be coated, a container or kettle K for the coating material, a coating nozzle N, and a drying chamber D. The storage chamber S may take any suitable form and is preferably provided with a tapered or funnel shape base 1, connected to a feed tube 2 leading to the nozzle N. In the embodiment shown, an agitator 3 of spiral form is rotatably journalled within the storage chamber S, this agitator being rotated by suitable driving means connected to a pulley 4 on the shaft thereof. The agitator 3 stirs the material to be coated, thereby preventing the clogging thereof in the chamber S and maintaining an even and continuous flow of this material to the nozzle N.

The container or kettle K for the coating material may be suitably constructed to accommodate the material employed and to maintain this material in the liquid state. In the embodiment shown, wherein the coating material is assumed to be chocolate, a pressure kettle provided with suitable heating means is employed. The kettle K preferably comprises a casing 5 having an air-tight cover 6 removably clamped thereto, and an open inner container 7 within the casing. A discharge pipe 8 passes through the cover 6 and extends within the inner container 7 to a point near the bottom thereof as shown. The pipe 8 is connected with a suitable hose or pipe 9 leading to the nozzle N, suitable means such as electric heating coils being incorporated in the hose 9 to maintain the chocolate therein above the melting temperature. The kettle K is heated to the required temperature by suitable means such as a burner 10. Compressed air is introduced through a pipe or hose 11 connected to an opening in the cover 6 in the casing 5, this air acting to force the melted chocolate out through the pipe 8 and the hose 9. A suitable pressure gauge 12 is preferably provided in connection with the casing 5. I have found an air pressure of 60 pounds per square inch suitable.

Compressed air is supplied to the nozzle N through two pipes or hoses 13 and 14. The air for use in the nozzle, as well as the air employed to force the melted chocolate from the kettle K, is obtained from a suitable source through a pipe 15 and is preferably passed through an air cleaner A of any suitable type before being conducted to the coating apparatus. By the use of the air cleaner, any dust or other foreign material which might be entrained in the air is removed, and all danger of clogging the nozzle passages or contaminating the material being treated is avoided. Suitable cut-off valves 16, 17 and 18 are preferably provided in the air hoses 11, 13 and 14 respectively, and suitable air pressure gauges 19 are preferably employed to indicate the pressure of the air as it leaves the cleaner A.

The nozzle N in which the coating of the material is effected comprises an important part of the apparatus, and one type of nozzle embodying the present invention has been shown in detail in Figs. 2 and 3. The nozzle shown includes a hollow casing 20 having a downwardly extending air tube 21 threadedly connected thereto and communicating with the interior thereof. A liquid pipe 22 passes through an opening in the side of the casing 20 and an air-tight connection between the outer surface of this pipe and the casing wall is provided by a sleeve 23 and a packing gland 24. The liquid pipe 22 is connected through an elbow fitting 25 to a liquid tube 26 which is disposed concentrically within the air tube 21 as clearly shown. The elbow fitting 25 and the tube 26 connected thereto are adjustably supported and centered within the chamber 20 and the air tube 21 by means of a set screw 27 threaded through an opening in the casing 20 and engaging a depression in the fitting 25 as shown. A coiled spring 28 is preferably provided beneath the head of the set screw 27, serving to maintain this screw in its adjusted position.

The inner bore of the air tube 21 is reduced at its lower end to fit closely about the liquid tube 26. A tapered cap 29, having an orifice 30 therein, is threadedly secured to the lower end of the air tube 21. This cap is arranged to surround the lower open end of the liquid tube 26, which extends a short distance within the orifice 30. A plurality of openings 31 are provided through the reduced portion at the lower end of the air tube 21 to conduct the air from this tube to the interior of the cap 29.

A casing 32 is threadedly connected to the outer surface of the air tube 21, being locked in place by a lock nut 33. This casing is provided with an angularly disposed feed passage 34, and has an outer cap 35 connected to the lower end thereof. The inner surface of the cap 35 is spaced from and substantially parallel to the outer surface of the inner cap 29, and an annular mixing chamber 36 is thereby provided between the caps 29 and 35 and within the casing 32. An orifice 37 is provided in the outer cap 35 in alignment with the orifice 30 of the inner cap 29, the outer orifice 37 being slightly larger in diameter than the inner orifice 30. A plurality of openings 38 are provided through the wall of the casing 32 at the upper end of the mixing chamber 36, to admit air to the mixing chamber for a purpose hereinafter described.

A tapered sleeve 39 is suitably secured to a shoulder 40 on the outer surface of the cap 35, this sleeve extending in spaced and converging annular relation to the tapered outer surface of the cap and terminating at a point adjacent the outer edge of the orifice 37. The space between the sleeve 39 and the outer surface of the cap 35 is connected by a tube 41 and a suitable valve 42 to the air supply hose 14. Thus the sleeve 39 comprises an auxiliary air nozzle directing an annular and converging stream of air against the stream of mixture leaving the nozzle 37. Compressed air is admitted to the casing 20 and the air tube 21 of the nozzle N from the air hose 13 through a valve 43 and suitable pipe connections as shown. The coating liquid, in the present instance chocolate, is conducted from the heated hose 9 through a needle valve 44 to the liquid pipe 22. The needle valve 44 is of well known construction, comprising a valve member 45 threaded into a valve casing 46 and adapted to engage a seat 47 when closed. By properly adjusting the position of the valve member 45 with respect to the seat 47, the flow of melted chocolate may be maintained at any desired value. The material to be coated is conducted from the pipe 2 to the feed passage 34 and the mixing chamber 36 through a cut-off valve 48. This valve may take any suitable form, and as shown, comprises a gate 49 slidably mounted in a fitting 50 and arranged to be moved across the path of the material to be coated.

The entire nozzle structure is preferably supported by suitable brackets 51 above an opening 52 in the platform or floor 53 on which the apparatus described above is located, this arrangement being clearly shown in Fig. 1. The drying chamber D, provided in connection with the embodiment of the invention shown in Fig. 1, comprises a long vertical passage or tower having diverging walls 54. The upper end of the chamber D is secured in communication with the opening 52, and an endless belt 55 or other suitable travelling surface extends horizontally across the lower end of the chamber to receive the coated material and carry it to a suitable receiving or storing chamber, not shown. The belt 55 may be carried and propelled by suitable rolls 56, and the upper span of the belt is preferably maintained in a substantially horizontal plane by means of a plurality of small rollers 57. The drying chamber D is preferably of considerable height to permit the complete drying of the material before it reaches the travelling surface 55. It has been found that a chamber approximately fifty feet high is suitable for this purpose.

Referring now more particularly to the operation of the apparatus described, and assuming an operation in which a material such as a granulated mixture of sugar and hedydrated milk is coated with chocolate, the container 7 of the kettle K is filled with melted chocolate which is maintained in a liquefied condition by heat from the burner 10. The cover 6 of the kettle K is securely clamped to the casing 5, and compressed air, regulated to the desired pressure, is applied to the kettle through hose 11. The container S is filled with the granular material to be coated, and compressed air from the air cleaner A is admitted, at the desired pressure, to the pipes or hoses 13 and 14. The valves 43 and 42 are now opened admitting compressed air to the casing 20, the air tube 21 and the interior of the tapered sleeve 39 of the nozzle N. The needle valve 44 is next opened and the melted chocolate, forced from the kettle K by the air pressure therein, flows through the pipe 22 and the liquid tube 26 and is converted into a stream of fine chocolate spray by the air from the air tube 21 this spray being carried out of the nozzle through the orifices 30 and 37. As soon as a spray of melted chocolate appears at the end of the nozzle N, the cut-off valve 48 in the material supply pipe is opened, thereby admitting the material to be coated to the feed passage 34 and the mixing chamber 36. The passage of air at a high velocity past the open ends of the liquid tube 26 and through the mixing chamber 36, draws the melted chocolate from the liquid tube and creates a partial vacuum within the mixing chamber. This action of the air stream comprises the well known induction or injector action and need not be described in further detail. The partial vacuum thus produced in the mixing chamber draws the material to be coated therein, and in order that this material may not be drawn into the mixing chamber at too high a rate, the openings 38 are provided connecting the rearward end of the mixing chamber with the surrounding atmosphere. The partial vacuum within the mixing chamber 36 is thereby reduced, and the streams of air from the openings 38 further serve to agitate the material within the mixing chamber and to prevent the sticking or clogging thereof.

As the material from the container S enters the mixing chamber 34, it is drawn into the stream or melted chocolate spray and each particle of the material is quickly and completely coated with chocolate. The air entering the mixing chamber through the openings 38 churns the particles into the fine chocolate spray and permits the effective application of the chocolate to all surfaces thereof.

As the spray of coated material leaves the orifice 37 in the outer cap 35 of the nozzle N, a converging angular blast of air is impressed thereon from the auxiliary air nozzle formed by the sleeve 39. This converging air stream serves to narrow or concentrate the stream of spray from the nozzle and also increases its velocity to a certain extent. This concentration of the spray stream is useful in preventing the coating material from spreading unduly upon leaving the nozzle and thereby coming into contact with the walls of the drying chamber D before the chocolate has become dried or set. It has been found however, that the apparatus can be successfully operated without the use of the auxiliary air nozzle comprising the sleeve 39.

The spray of coated material, upon leaving the nozzle N, is directed into the drying chamber D. Due to the sudden increase in the cross section of the duct through which this spray is passing, the velocity of the air stream and the coated particles entrained therein is rapidly decreased. The diverging arrangement of the walls 54 of the chamber D aid in thus reducing the velocity of the coated particles, and due to their reduced velocity, the chocolate coating thereon dries and sets before the particles settle on the moving conveyor 55. The conveyor carries the dry coated material to suitable receiving or storing containers.

During the operation of the apparatus, the agitator 3 in the material container S is preferably kept in motion to insure the even flow of the material to be coated. Also, as described above, suitable electric heating means in the chocolate hose 9 is maintained energized to keep the chocolate at the desired melting temperature as it travels from the kettle K to the nozzle N. The rates of flow of the chocolate, the material to be coated and the air supplied to the nozzle may be adjusted to the desired value by proper manipulation of the valves 44, 48, 43 and 42 respectively. By thus adjusting the flow of the materials and the air through the nozzle N, the thickness of the coating applied to the particles may be variably adjusted.

In certain arrangements of the apparatus, the liquid may be drawn into the nozzle by injector action only, no pressure being required in the liquid container. Further, the container S for the material to be coated may be disposed at any desired point with relation to the nozzle N, the vacuum created within the mixing chamber being sufficient to draw the granular material therein even though no gravity feed for this material is provided.

The modification shown in Fig. 4 employs the same liquid container, air cleaner, material container and nozzle described above in connection with the modification of Figs. 1, 2 and 3 and the devices shown in Fig. 4 are referred to by the same reference characters as those designating corresponding devices in the other figures. In the modification of Fig. 4, the nozzle N is mounted in a horizontal position, the material container S being disposed above the nozzle and being connected thereto through a vertical pipe 58. Thus the spray of coated material is directed horizontally, and enters a converging receiving hopper H. The mouth of the hopper H is provided with an inturned lip or inner sleeve 59 having an annular air passage 60 communicating with the space between this sleeve and the inner wall of the hopper at the mouth thereof, as clearly shown in Fig. 4. A suitable air blower B, capable of delivering a comparatively large volume of air, is connected to the annular air passage 60 by a pipe 61. By means of this arrangement, a current of air is directed along the inner walls of the hopper H, as indicated in the drawing. The hopper H is connected to a long passage or tube 62 leading to a separator 63 as shown.

In the operation of the modification shown in Fig. 4, the spray of coated material from the nozzle N enters the hopper H and is carried through the tube 62 by its velocity and by the air stream from the blower B. This air stream, being directed along the inner walls of the hopper, prevents the coated material from coming into contact with and sticking to the hopper walls, and further accelerates the drying of the coating material. Upon reaching the separator 63, the particles of dried coated material settle to the bottom thereof and are conducted to suitable storage bins or containers by a pipe 64.

From the description given, it will be apparent that the present invention provides a very simple and efficient method and means for coating small objects with a liquefiable coating material. The apparatus may be operated continuously, and is very economical in its power of consumption. Further, the entire process is carried out automatically, and when once set into operation, the apparatus requires practically no attention.

Although the present invention has been described in connection with a rather specific form of apparatus and with the treatment of certain specific materials, it should be clearly understood that the invention is not limited to either the specific apparatus shown, the specific process described, or the materials described as being treated by this process and apparatus.

The product of the herein described and claimed process is being claimed in my copending application, Serial No. 355,795, filed April 17, 1929.

I claim:

1. The process of coating finely divided material with a liquified coating material which consists in creating a swiftly moving air current, introducing first the coating material and then the finely divided material at successive points in said air current, and carrying the coated material in said air current until said coating material has dried or hardened.

2. The process of coating finely divided material with a liquefied coating material which consists in creating a swiftly moving air current, separately drawing first the coating material and then the material to be coated into said air current by injector action, and carrying the coated material in said air current until said coating material has hardened.

3. The process of coating finely divided material with a liquefied coating material which consists in creating a swiftly moving air current, introducing first the liquefied coating material and then the material to be coated to the air current, and narrowing the extent of the air current carrying the coated material by impressing thereon a second air current and carrying the coated material in said air current until said coating material is hardened.

4. The process of coating finely divided material with a liquefied coating material which consists in creating a swiftly moving air current, introducing first the coating material and then the material to be coated at successive points in an air current, and concentrating and accelerating said air current carrying the coated material by impressing thereon an inwardly directed annular air current and carrying the coated material in said air current until said coating material is hardened.

5. Apparatus for coating finely divided material comprising a mixing chamber, means for directing an air current through said mixing chamber and means for introducing the coating material into the current of air as it enters the chamber and means for introducing the material to be coated to said mixing chamber.

6. Apparatus for coating finely divided material comprising a nozzle including a mixing chamber having an orifice therein, means for directing an air current through said chamber and out of said orifice, and means for introducing first the coating material and then the material to be coated to said air current at successive points in said chamber.

7. Apparatus for coating finely divided material comprising a nozzle having an orifice therein, means for directing a stream of air through said nozzle and said orifice, means for introducing first the coating material and then the material to be coated to said air stream within said nozzle, and means outside of said orifice for directing an annular converging stream of air against the stream of coated material leaving said orifice.

8. Apparatus for coating finely divided material comprising a nozzle having an outlet orifice therein, a central liquid tube within said nozzle for conveying the coating liquid to a point adjacent to but within said orifice, an air tube having an opening adjacent the end of said liquid tube for directing a stream of air through said orifice and means for introducing the material to be coated to the space between the end of said air tube and said orifice.

9. Apparatus for coating finely divided material with a liquefied coating material comprising a nozzle having an outlet orifice at one end thereof, a mixing chamber within said nozzle and adjacent said orifice, a liquid tube within said nozzle having an opening in said mixing chamber, an air tube surrounding said liquid tube and having an opening annularly disposed with respect to the opening of said liquid tube, and means for introducing the material to be coated to said mixing chamber.

10. Apparatus for coating finely divided material with a liquefied coating material comprising a nozzle having an orifice therein, means within said nozzle for directing a stream of air through said orifice at a high velocity, means for introducing first the coating liquid and then the material to be coated at points adjacent said air stream whereby said coating liquid and said material to be coated are drawn through said nozzle by ejector action and expelled therefrom through said orifice in said air stream.

11. Apparatus for coating finely divided material with a liquefied coating material comprising a nozzle having an orifice therein, an air tube within said nozzle having an opening for directing a stream of air through said orifice at a high velocity, a liquid tube disposed within said air tube and having an opening adjacent the opening of said air tube whereby the coating liquid is drawn from said liquid tube into the air stream by injector action, a tapered mixing chamber in said nozzle surrounding said air tube and means for introducing the material to be coated to said mixing chamber, said air stream acting to draw said material to be coated into the mixing chamber by injector action.

12. Apparatus for coating finely divided material with a liquefied coating material comprising a nozzle having an orifice therein, an air tube within said nozzle having an opening for directing a stream of air through said orifice at a high velocity, a liquid tube disposed within said air tube and having an opening adjacent the opening of said air tube whereby the coating liquid is drawn from said liquid tube into the air stream by injector action, a tapered mixing chamber in said nozzle surrounding said air tube, means for introducing the material to be coated to said mixing chamber, said air stream acting to draw said material to be coated into the mixing chamber by injector action, and means surrounding said orifice outside of said nozzle for directing a converging air stream on the air stream leaving said orifice.

13. Apparatus for coating finely divided material with a liquefied coating material comprising a nozzle having an orifice therein, a tapered mixing chamber within said nozzle, means for directing an air stream through said mixing chamber and out through said orifice, means for introducing the coating liquid into said air stream, means for admitting the material to be coated to said mixing chamber, and means for admitting additional air to said mixing chamber whereby the partial vacuum produced by the flow of said air stream is reduced and said material to be coated is agitated.

14. Apparatus for coating finely divided material with a liquefied coating material comprising a nozzle including a mixing chamber having an orifice therein, means for directing air under pressure through said chamber and out of said orifice, means for separately introducing first the coating liquid and then the material to be coated into said chamber, and means for regulating the rates of flow of the air, the coating liquid and the material to be coated.

15. Apparatus for coating finely divided material with a coating material comprising a nozzle, means for passing an air stream through said nozzle at a high velocity, means for introducing the coating material and material to be coated to said air stream in said nozzle, a chamber for receiving the coated material from said nozzle and means for removing the coated material from said chamber.

16. Apparatus for coating finely divided material with a coating material comprising a nozzle, means for passing an air stream through said nozzle at a high velocity, means for introducing the coating material and material to be coated to said air stream in said nozzle, a vertical chamber for receiving said coated material from said nozzle, and a moving conveyor at the bottom of said chamber for removing the coated material.

17. Apparatus for coating finely divided material with melted chocolate comprising a nozzle, means for passing air under pressure through said nozzle, means for introducing the melted chocolate and finely divided material into said nozzle, a vertical chamber having diverging walls extending downwardly from said nozzle for receiving the coated material and decreasing the velocity thereof to permit the chocolate to dry, and a continuously moving platform extending across the lower end of said chamber for removing the dried coated material therefrom.

18. The process of coating finely divided edible material with chocolate which comprises creating a swiftly moving air current, introducing molten chocolate into said current, thereby producing a molten chocolate spray, subsequently introducing the finely divided material to be coated into the air current, and suspending the chocolate coated material in air until the chocolate has hardened.

19. The process of coating granulated sugar with chocolate which comprises forming a spray of molten chocolate by means of compressed air, passing the spray through a loose mass of granulated sugar whereby the sugar is carried along by the force of the spray and coated thereby, and maintaining the thus coated sugar particles in suspension until the chocolate has hardened.

In testimony whereof I affix my signature.

EDWARD A. ZEBULSKE.